United States Patent
Takemura (10) Patent No.: US 9,066,052 B2
(45) Date of Patent: Jun. 23, 2015

(54) IMAGE FORMING APPARATUS FOR FORMING A MEASUREMENT IMAGE ON A SHEET

(71) Applicant: CANON KABUSHIKI KAISHA, Tokyo (JP)

(72) Inventor: Taichi Takemura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/138,788

(22) Filed: Dec. 23, 2013

(65) Prior Publication Data

US 2014/0185114 A1 Jul. 3, 2014

(30) Foreign Application Priority Data

Dec. 28, 2012 (JP) ................................ 2012-288230

(51) Int. Cl.
  *H04N 1/60* (2006.01)
  *H04N 1/00* (2006.01)
(52) U.S. Cl.
  CPC ............ *H04N 1/60* (2013.01); *H04N 1/00005* (2013.01); *H04N 1/00013* (2013.01); *H04N 1/00023* (2013.01); *H04N 1/00034* (2013.01)
(58) Field of Classification Search
  None
  See application file for complete search history.

(56) References Cited

U.S. PATENT DOCUMENTS

| | | | | |
|---|---|---|---|---|
| 5,280,368 A * | 1/1994 | Fullerton | ....................... | 358/474 |
| 5,386,299 A * | 1/1995 | Wilson et al. | ................. | 358/406 |
| 6,427,128 B1 * | 7/2002 | Satake et al. | ..................... | 702/81 |
| 8,783,814 B2 * | 7/2014 | Bradley et al. | .................. | 347/16 |
| 2004/0021869 A1 * | 2/2004 | Shakespeare et al. | ........ | 356/429 |
| 2006/0268346 A1 * | 11/2006 | van Os | ......................... | 358/3.26 |
| 2008/0056737 A1 * | 3/2008 | Flemming et al. | .............. | 399/15 |
| 2008/0180763 A1 * | 7/2008 | Nishizawa et al. | ........... | 358/498 |
| 2008/0239416 A1 * | 10/2008 | Kato et al. | ..................... | 358/498 |
| 2012/0092731 A1 * | 4/2012 | Nishida et al. | ................ | 358/474 |
| 2012/0194599 A1 * | 8/2012 | Kido | ............................. | 347/19 |

FOREIGN PATENT DOCUMENTS

JP       2004-086013 A       3/2004

* cited by examiner

*Primary Examiner* — Kimberly A Williams
(74) *Attorney, Agent, or Firm* — Canon USA Inc. IP Division (57) ABSTRACT

An image forming apparatus includes an image forming unit configured to form a measurement image on a sheet, a measurement unit configured to irradiate light on the measurement image and measure reflected light from the measurement image, a white reference plate provided to be movable to a first position and a second position, a black member provided to be movable to a third position where the black member shields light that is irradiated on the white reference plate and to a fourth position that is retracted from the third position, and a control unit configured to, in a state in which the white reference plate is at the second position and the black member is at the third position, cause the sheet, on which the measurement image has been formed, to pass between the measurement unit and the black member and cause the measurement unit to measure the measurement image.

13 Claims, 11 Drawing Sheets

IMAGE FORMING APPARATUS FOR FORMING A MEASUREMENT IMAGE ON A SHEET

BACKGROUND OF THE INVENTION

1. Field of the Invention

The present disclosure generally relates to image forming and, more particularly, to an image forming apparatus that includes a function of measuring color in a measurement image.

2. Description of the Related Art

Aspects of the quality of an image (hereinafter referred to as image quality) formed by an image forming apparatus include graininess, in-plane uniformity, character integrity, and color reproducibility (including color stability). Today, with the popularization of multicolor image forming apparatuses, it is sometimes said that the most important aspect of image quality is color reproducibility.

People have a memory relating to an expected color (especially skin color, blue sky, metals and the like) based on experience. When a color exceeds an allowable range of the memory, the color feels strange. These colors are called memory colors, and the reproducibility of those colors is often important when a photograph or the like is output.

Not only in photographic images but also in document images, increasing demands are being placed on the level of color reproducibility (including color stability) that an image forming apparatus needs to have by office users, who feel a difference between the reproduced color and that on the monitor, and graphic art users who require color reproducibility in computer graphics (CG) images.

Therefore, to satisfy the demands for color reproducibility from users, an image forming apparatus has been proposed that reads a measurement image (a patch image) formed on a sheet with a measurement unit (a color sensor) provided on a sheet conveyance path (e.g., refer to Japanese Patent Application Laid-Open No. 2004-086013). According to this image forming apparatus, a predetermined density, gradation, and tint can be reproduced by applying feedback on processing conditions, such as exposure amount and development bias, based on a reading result of the patch image by the color sensor.

However, the color measurement accuracy of the color sensor discussed in Japanese Patent Application Laid-Open No. 2004-086013 deteriorates due to factors such as variation in the output of the light source caused by changes in the environmental temperature. One way to resolve this problem is to arrange a white reference plate at a position opposite the color sensor and perform processing to correct the measurement value of the color sensor by measuring the white reference plate with the color sensor.

If a white reference plate is provided, highly accurate measurement can be performed by setting the distance from the color sensor to the white reference plate to be equal to the distance from the color sensor to the sheet when measuring the patch image. Consequently, it is desirable to arrange the white reference plate at a position where the sheet passes through during the measurement by the color sensor (hereinafter referred to as a "target position").

However, if the white reference plate is fixed at the target position, a jam can occur due to the sheet on which the patch image is formed contacting the white reference plate. To prevent this, a white reference plate attaching/detaching mechanism needs to be provided, so that during the measurement of the white reference plate the white reference plate is moved to the target position (attachment operation), and during the measurement of the patch image on the sheet the white reference plate is moved away from the color sensor (detachment operation).

On the other hand, when the patch image is measured, light irradiated from the color sensor passes through the sheet, and is irradiated on the white reference plate. Light reflected from the white reference plate passes back through the sheet and is received by the color sensor. Since the amount of reflected light from the white reference plate varies depending on the distance from the color sensor to the white reference plate, there is the problem that if the separation position of the white reference plate is different, the measurement value of the patch image varies.

SUMMARY OF THE INVENTION

The present disclosure is directed to an image forming apparatus capable of suppressing the influence of differences in the separation position of a white reference plate on the measurement value of a measurement unit.

According to an aspect of the present disclosure, an image forming apparatus includes an image forming unit configured to form a measurement image on a sheet, a measurement unit configured to irradiate light on the measurement image and measure reflected light from the measurement image, a white reference plate provided to be movable to a first position opposite the measurement unit and to a second position that is further away from the measurement unit than the first position, a black member provided to be movable to a third position where the black member shields light that is irradiated on the white reference plate from the measurement unit and to a fourth position that is retracted from the third position, and a control unit configured to, in a state in which the white reference plate is at the second position and the black member is at the third position, cause the sheet, on which the measurement image has been formed, to pass between the measurement unit and the black member and cause the measurement unit to measure the measurement image.

Further features of the present disclosure will become apparent from the following description of exemplary embodiments with reference to the attached drawings.

DESCRIPTION OF THE EMBODIMENTS

An exemplary embodiment according to the present disclosure will be described using an electrophotographic laser beam printer. Although in this exemplary embodiment an electrophotographic method is employed as the image forming method, the present invention can also be applied in an inkjet method or a sublimation method. In an inkjet method, an image forming unit that forms an image on a sheet by discharging ink and a fixing unit (drying unit) that dries the ink are used.

Figure 1:
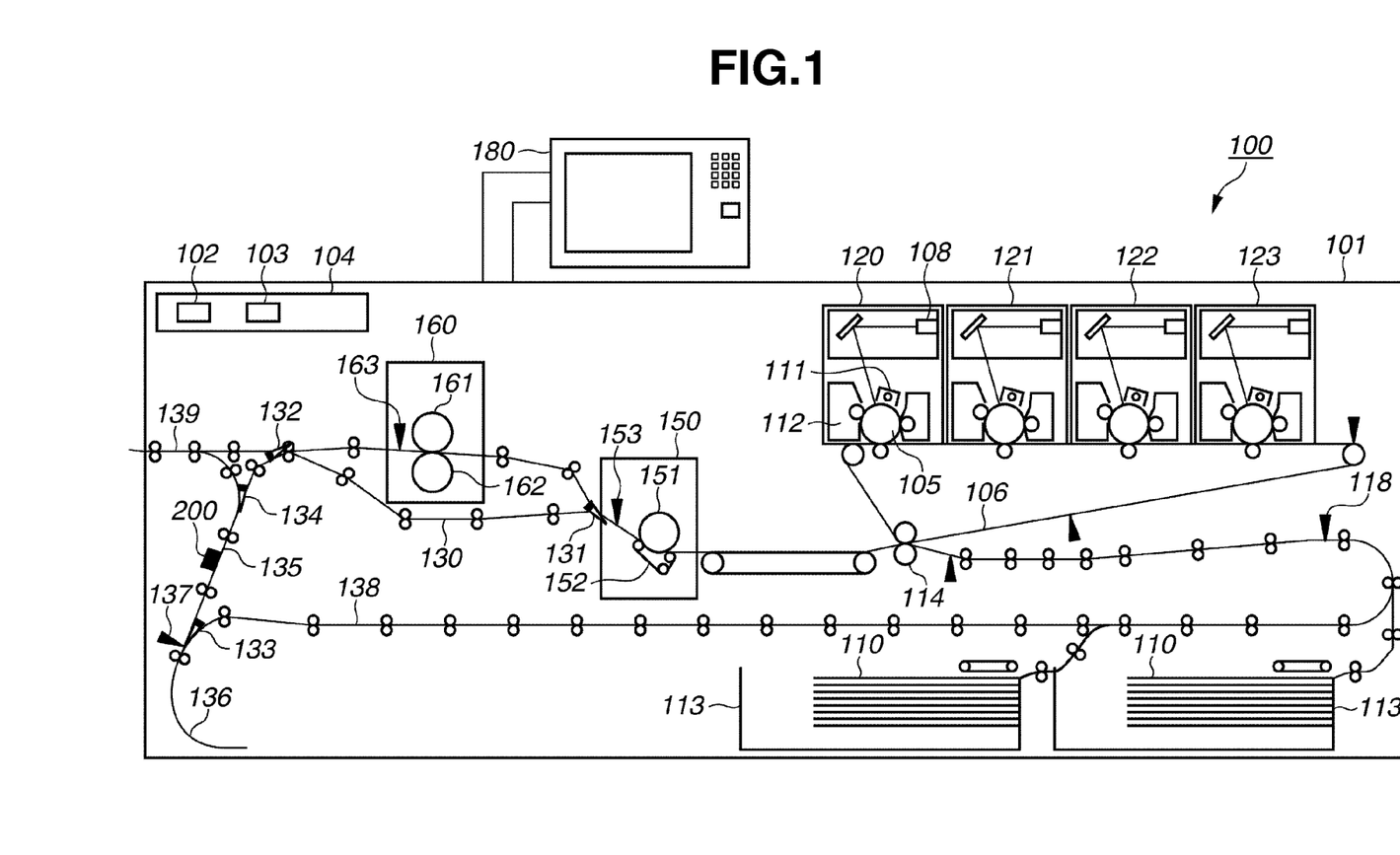
FIG. 1 is a cross-sectional view illustrating a configuration of an image forming apparatus.

FIG. 1 is a cross-sectional view illustrating a configuration of an image forming apparatus 100. The image forming apparatus 100 includes a housing 101. The housing 101 is provided with various mechanisms for configuring an engine unit, and a control board storage unit 104. The control board storage unit 104 stores an engine control unit 102 that executes control relating to various print processing processes (e.g., a paper feed process) by various mechanisms, and a printer controller 103.

As illustrated in FIG. 1, four stations 120, 121, 122, and 123 corresponding to YMCK are provided in the engine unit. The stations 120, 121, 122, and 123 are image forming units that form an image by transferring toner onto a sheet 110. Here, YMCK is an abbreviation for yellow, magenta, cyan, and black. Each station is configured from substantially the same parts. A photosensitive drum 105, which is a type of image bearing member, is charged by a primary charging device 111 to a uniform surface potential. A latent image is formed on the photosensitive drum 105 by laser light output by a laser 108. A developing unit 112 forms a toner image by developing the latent image using a color material (toner). The toner image (visible image) is transferred onto an intermediate transfer member 106. The visible image formed on the intermediate transfer member 106 is transferred onto the sheet 110, conveyed from a storage unit 113, by a transfer roller 114.

A fixing process mechanism according to the present embodiment includes a first fixing unit 150 and a second fixing unit 160 that fix the toner image transferred onto the sheet 110 by applying heat and pressure. The first fixing unit 150 includes a fixing roller 151 for applying heat to the sheet 110, a pressure belt 152 for pressing the sheet 110 against the fixing roller 151, and a first fixing sensor 153 that detects fixing completion. The fixing roller 151 is a hollow roller that includes a heater therein. As used herein, the term "unit" generally refers to any combination of software, firmware, hardware, or other component that is used to effectuate a purpose.

The second fixing unit 160 is arranged downstream from the first fixing unit 150 in the conveyance direction of the sheet 110. The second fixing unit 160 applies gloss to the toner image on the sheet 110, which has been fixed by the first fixing unit 150, and ensures fixing. Similar to the first fixing unit 150, the second fixing unit 160 also includes a fixing roller 161, a pressure roller 162, and a second fixing sensor 163. Depending on the type of sheet, the sheet 110 may not need to pass through the second fixing unit 160. In such a case, to reduce energy consumption, the sheet 110 passes through a conveyance path 130 without passing through the second fixing unit 160.

For example, if a setting has been made that adds a large amount of gloss to the sheet 110 or if the sheet 110 needs a large amount of heat for fixing, such as for thick paper, the sheet 110 that has passed through the first fixing unit 150 is conveyed to the second fixing unit 160 too. On the other hand, if the sheet 110 is plain paper or thin paper, and a setting that adds a large amount of gloss has not been made, the sheet 110 is conveyed along the conveyance path 130 without passing through the second fixing unit 160. Whether the sheet 110 is conveyed to the second fixing unit 160 or bypasses the second fixing unit 160 is controlled by a switching member 131.

A switching member 132 is a guide member that guides the sheet 110 to a conveyance path 135 or to a discharge path 139 that leads out of the apparatus. A leading edge of the sheet 110 that has been guided to the conveyance path 135 passes by a reverse sensor 137, and is conveyed to a reversing unit 136. When the reverse sensor 137 detects the trailing edge of the sheet 110, the conveyance direction of the sheet 110 is switched. A switching member 133 is a guide member that guides the sheet 110 to a conveyance path 138 for two-sided image formation or to the conveyance path 135.

A color sensor 200 that detects a measurement image (hereinafter referred to as "patch image") on the sheet 110 is arranged in the conveyance path 135. The color sensor 200 includes four color sensors 200a to 200d, which are provided side by side in a direction orthogonal to the conveyance direction of the sheet 110, so that four rows of patch images can be measured. When an instruction to perform color detection is issued from an operation unit 180, the engine control unit 102 executes density adjustment, tone adjustment, multicolor correction processing and the like. During density adjustment and gradation adjustment, the density of a monochromatic measurement image is measured, and during multicolor correction processing, the colors in a measurement image in which a plurality of colors are superimposed are measured.

A switching member 134 is a guide member that guides the sheet 110 to the discharge path 139 that leads out of the apparatus. The sheet 110 conveyed to the discharge path 139 is discharged out of the image forming apparatus 100.

Figure 2:
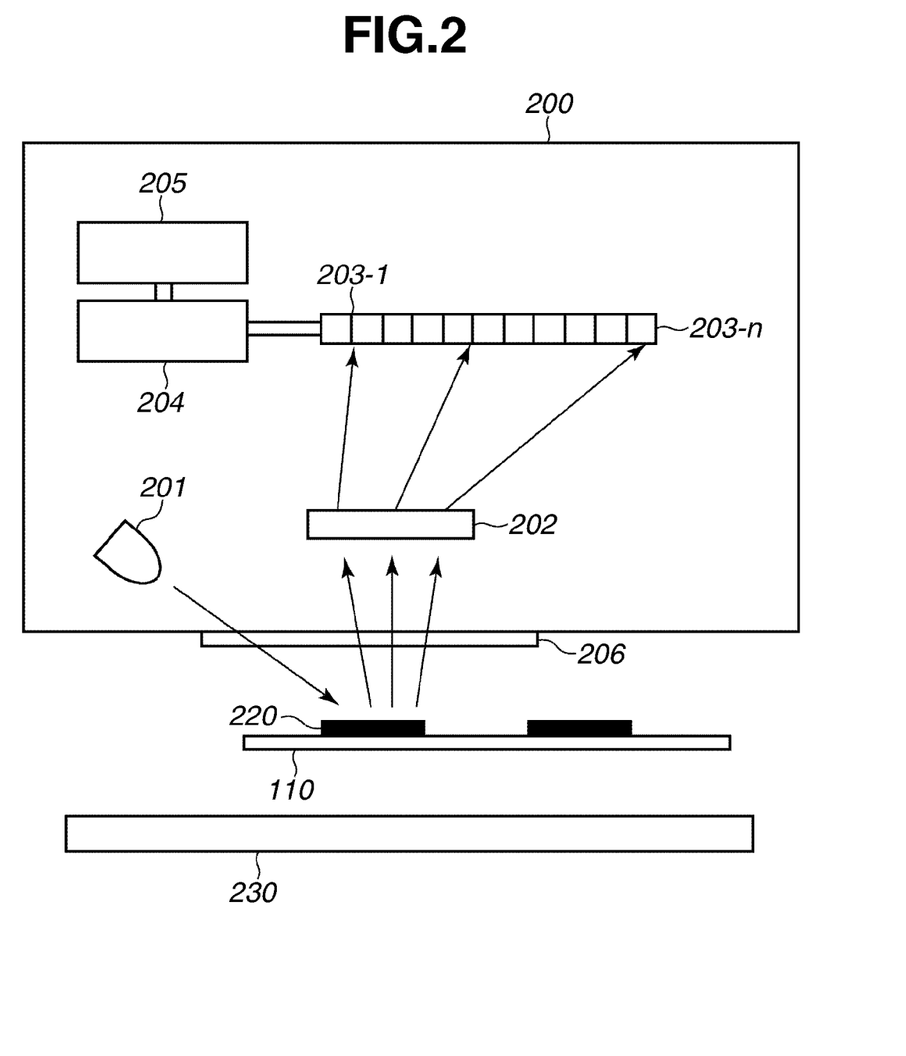
FIG. 2 illustrates a configuration of a color sensor.

FIG. 2 illustrates the configuration of the color sensor 200. The color sensor 200 includes a white light-emitting diode (LED) 201, a diffraction grating 202, a line sensor 203, a calculation unit 204, and a memory 205. The white LED 201 is a light-emitting element that irradiates light onto a patch image 220 on the sheet 110. The light reflected from the patch image 220 passes through a window 206, which is formed from a transparent member.

The diffraction grating 202 splits the light reflected from the patch image 220 into each wavelength. The line sensor 203 is a photodetection element that includes n-number of light-receiving elements that detect the light split by the diffraction grating 202 into each wavelength. The calculation unit 204 performs various calculations based on the light intensity value of each pixel detected by the line sensor 203.

The memory 205 stores various kinds of data used by the calculation unit 204. The calculation unit 204 includes, for example, a spectral calculation unit that calculates spectral reflectance based on light intensity values. In addition, a lens may be further provided that focuses the light irradiated from the white LED 201 onto the patch image 220 on the sheet 110 and focuses the light reflected from the patch image 220 onto the diffraction grating 202.

A white reference plate 230 is provided at a position opposite the color sensor 200. In the present exemplary embodiment, calibration of the color sensor 200 is performed by measuring the reflected light from the white reference plate 230. This calibration is an operation in which the light amount of the LED 201 is adjusted and spectral reflectance is calculated by irradiating light from the LED 201 on the white reference plate 230 and detecting the light reflected from the white reference plate 230 with the line sensor 203.

When performing multicolor correction processing, the image forming apparatus 100 generates a below-described International Color Consortium (ICC) profile from a detection result of the patch image including multiple colors, and forms an output image by converting the input image using that profile.

Figure 3:
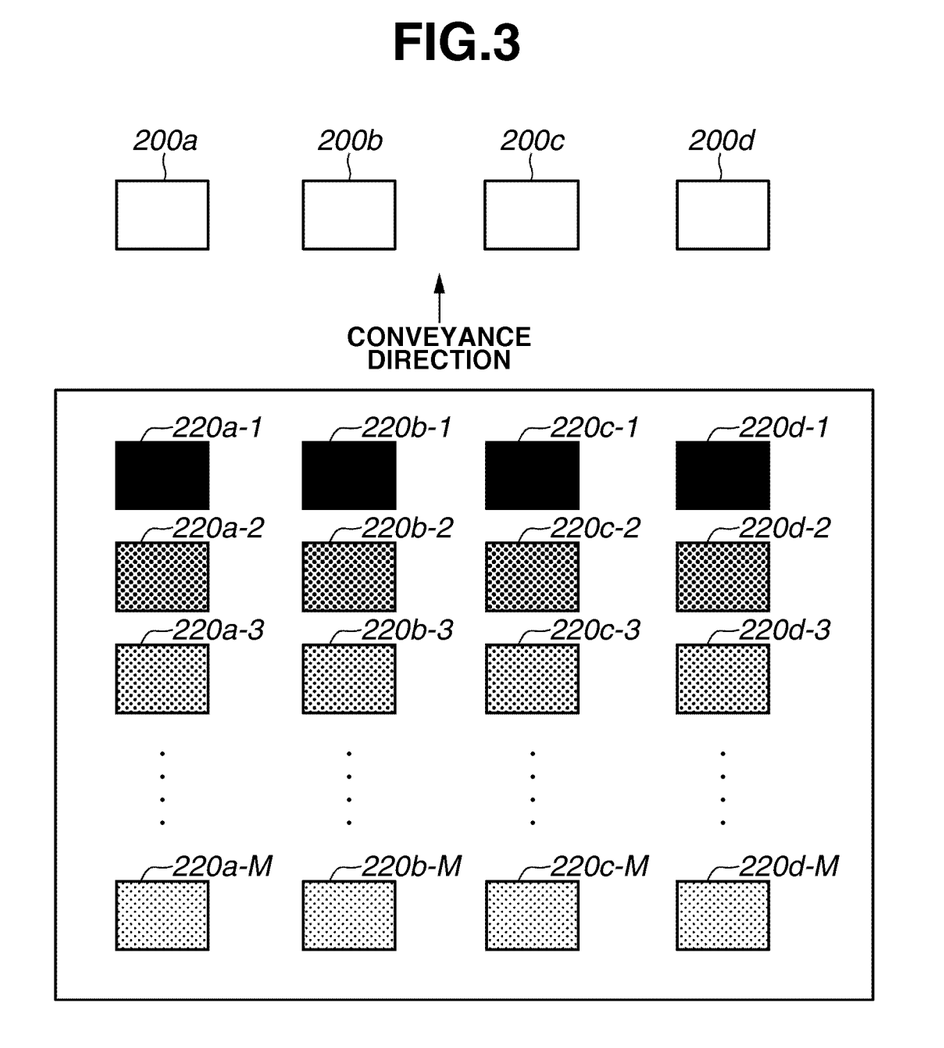
FIG. 3 is an image diagram illustrating a color measurement chart.

The patch image 220 that includes multiple colors is formed by changing the halftone dot area ratio for each of the four CMYK colors into three levels (0%, 50%, and 100%), and combining all of the halftone dot area ratios for each color. As illustrated in FIG. 3, the patch image 220 is formed so that patch images 220a to 220d in four rows side by side on the sheet can be read by color sensors 200a to 200d, respectively. Each of patch images 220a to 220d includes a first patch image (220a-1, 220b-1, 220c-1, or 220d-1) through an m-th patch image (220a-M, 220b-M, 220c-M, or 220d-M).

As a profile that realizes excellent color reproducibility, an ICC profile, which has become commercially accepted in recent years, is used herein. However, the present invention can be applied to profiles other than the ICC profile. For example, the present disclosure can be applied to a color rendering dictionary (CRD) adopted in PostScript Level 2 or later, and a color separation table in Photoshop® or the like, both of which are created by Adobe.

A user operates the operation unit 180 to request that color profile generation processing be performed in instances such as when a component is replaced by a customer engineer, before a job involving color matching accuracy, when the user wishes to know the color of the final output product during a design concept phase and the like.

Figure 4:
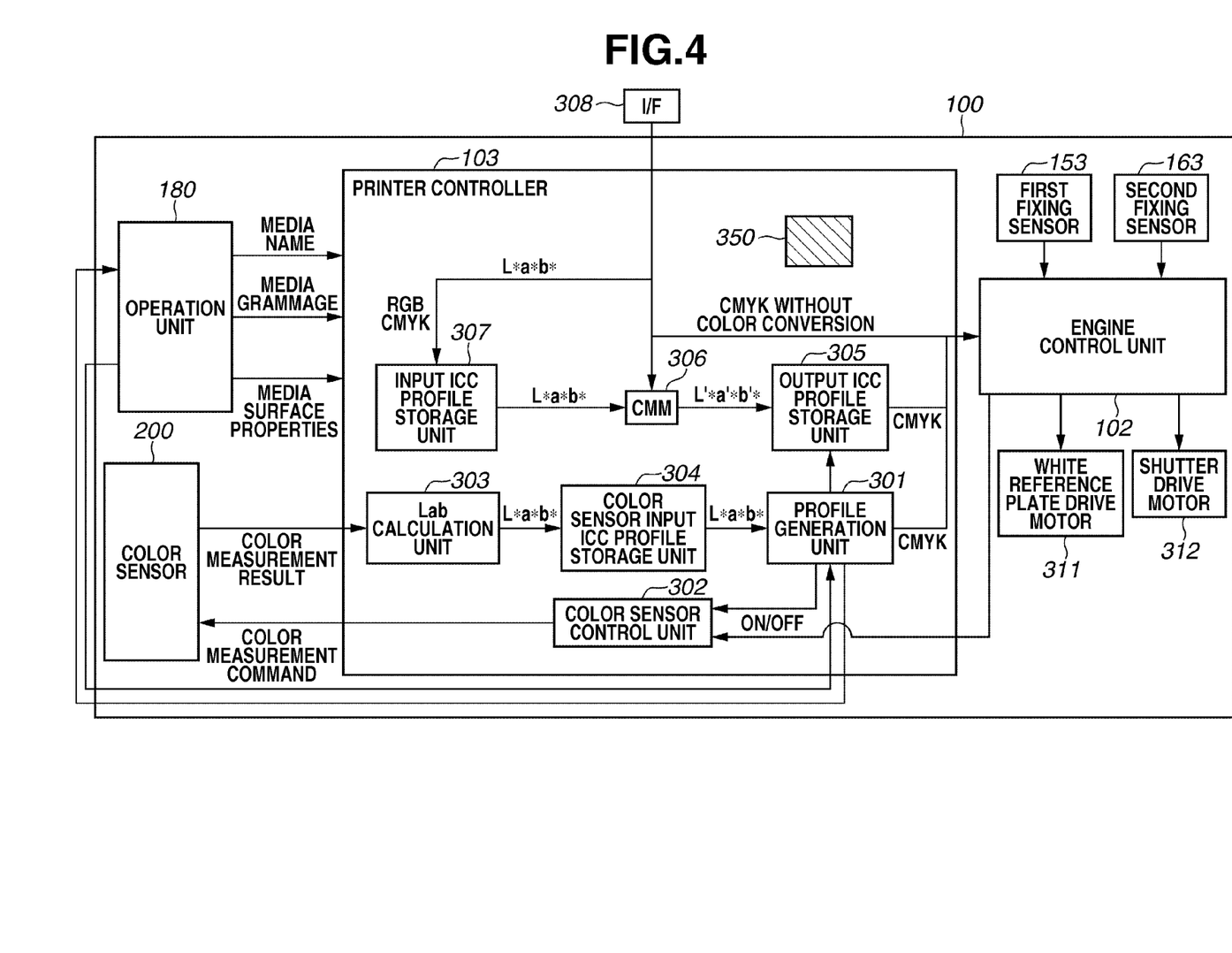
FIG. 4 is a block diagram illustrating a system configuration of an image forming apparatus.

The process for generating a profile is performed by the printer controller 103 illustrated in the block diagram of FIG. 4. The printer controller 103, which includes a central processing unit (CPU), reads and executes a program for executing the below-described flowchart from a storage unit 350. In FIG. 4, the inside of the printer controller 103 is represented by blocks in order to simplify the description of the processes executed by the printer controller 103.

When the operation unit 180 has received a profile generation instruction, a profile generation unit 301 outputs a CMYK color chart 210, which is an ISO 12642 test form, to the engine control unit 102 without passing through the profile. The profile generation unit 301 transmits a measurement instruction to a color sensor control unit 302. The engine control unit 102 controls the image forming apparatus 100 in such a way as to execute processes such as charging, exposure, developing, transfer, and fixing. Consequently, an ISO 12642 test form is formed on the sheet 110.

The color sensor control unit 302 controls the color sensor 200 in such a way as to measure the ISO 12642 test form. The color sensor 200 outputs spectral reflectance data, which is the measurement result, to an Lab calculation unit 303 in the printer controller 103. The Lab calculation unit 303 converts the spectral reflectance data into color value data (L*a*b* data), and outputs the color value data to the profile generation unit 301. At this stage, the L*a*b* data output from the Lab calculation unit 303 is converted using a color sensor input ICC profile that is stored in a color sensor input ICC profile storage unit 304. The Lab calculation unit 303 may also convert the spectral reflectance data into a CIE 1931 XYZ color system, which is a color space signal that is independent of the device.

The profile generation unit 301 generates an output ICC profile based on the relationship between the CMYK color signal output to the engine control unit 102 and the L*a*b* data that has been converted using the color sensor input ICC profile. The profile generation unit 301 stores the generated output ICC profile in an output ICC profile storage unit 305.

The ISO 12642 test form includes a patch of CMYK color signals that cover a color reproducibility range that can be output by a general copying machine. Therefore, the profile generation unit 301 generates a color conversion table based on the relationship between each color signal value and the measured L*a*b* value. Namely, a CMYK→Lab conversion table is generated. Based on this conversion table, an inverse conversion table is generated.

Upon receiving a profile generation command from a host computer via an interface (I/F) 308, the profile generation unit 301 outputs the generated output ICC profile to the host computer via the I/F 308. The host computer can execute color conversion corresponding to the ICC profile using an application program.

Although their operation will be described in detail below, a white color reference plate drive motor 311 is a motor for driving the white reference plate 230, and a shutter drive motor 312 is a motor for driving a shutter 214. These motors are controlled by the engine control unit 102.

In color conversion using normal color output, an image signal input based on red-green-blue (RGB) signal values or standard printing CMYK signal values, such as Japan Color, input from a scanner unit via the I/F 308 is transmitted to an input ICC profile storage unit 307 for external input. The input ICC profile storage unit 307 executes conversion from RGB into L*a*b* or from CMYK into L*a*b* based on the image signal input from the I/F 308. An input ICC profile stored in the input ICC profile storage unit 307 is formed from a plurality of lookup tables (LUTs).

These LUTs are, for example, a one-dimensional LUT that controls the gamma of the input signal, a multi-dimensional LUT that is called direct mapping, and a one-dimensional LUT that controls the gamma of generated conversion data. The input image signal is converted from a device-dependent color space into device-independent L*a*b* data using these LUTs.

The image signal converted into L*a*b* coordinates is input to a CMM 306. CMM is an abbreviation for color management control. The CMM 306 executes various types of color conversion. For example, the CMM 306 executes GAMUT conversion in which a mismatch between a read color space of the scanner unit as an input device and an output color reproducibility range of the image forming apparatus 100 as an output device is mapped. In addition, the CMM 306 executes color conversion in which a mismatch (also referred to as a color temperature setting mismatch) between the type of light source during input and the type of light source when observing an output product is adjusted.

Thus, the CMM 306 converts the L*a*b* data into L'*a'*b'* data, and outputs the L'*a'*b'* data to the output ICC profile storage unit 305. The profile generated by this measurement is stored in the output ICC profile storage unit 305. Consequently, the output ICC profile storage unit 305 converts the L'*a'*b'* data using the newly generated ICC profile into an output device-dependent CMYK signal, and outputs the CMYK signal to the engine control unit 102.

Figure 5:
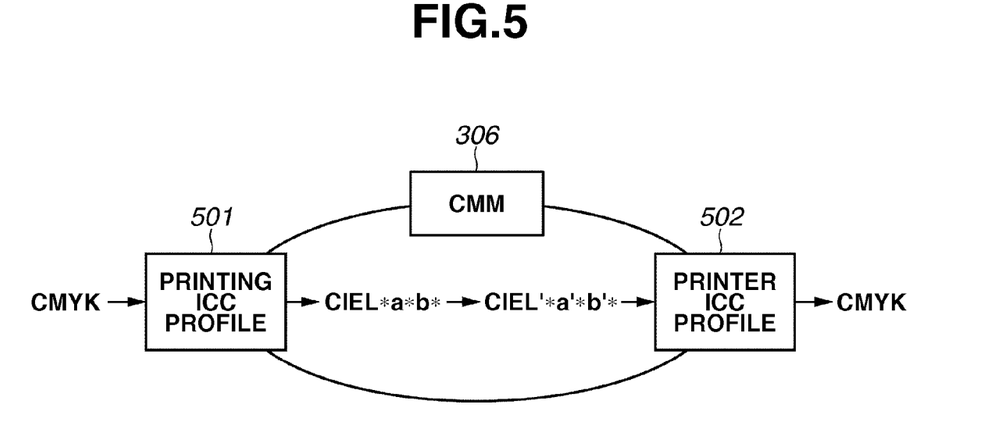
FIG. 5 is a schematic diagram of a color management environment.

In FIG. 4, the CMM 306 is separate from the input ICC profile storage unit 307 and the output ICC profile storage unit 305. However, as illustrated in FIG. 5, the CMM 306 is a module in charge of color management, and performs color conversion using an input profile (printing ICC profile 501) and an output profile (printer ICC profile 502).

Figure 6A:
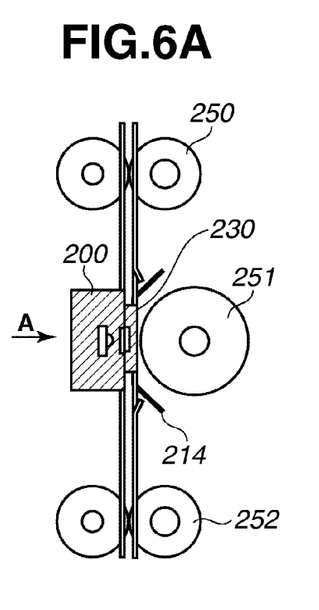
FIGS. 6A and 6B illustrate an operation in which a color sensor measures a white reference plate.
Figure 6B:
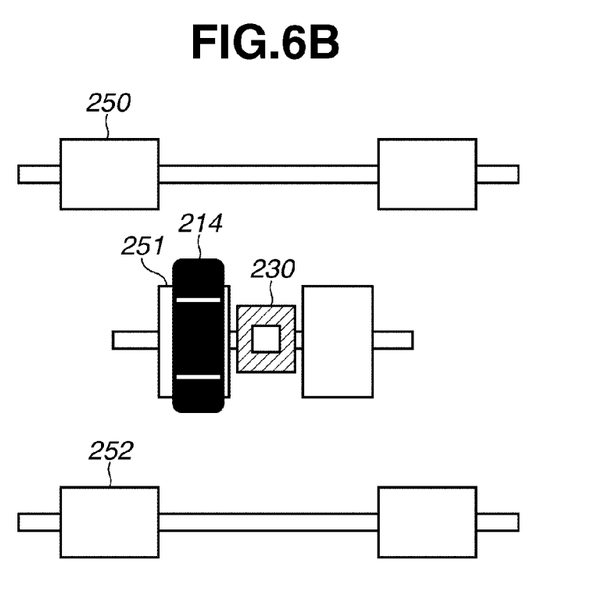
Figure 7A:
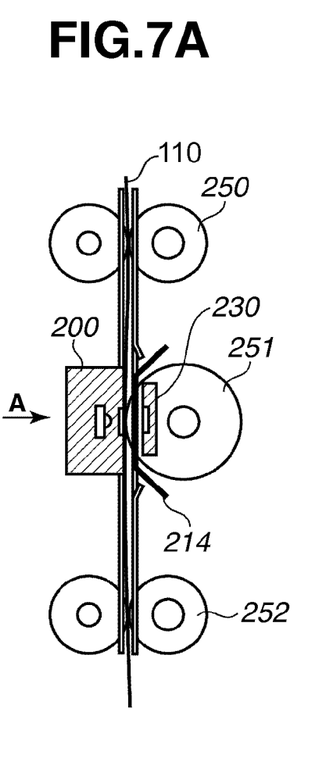
FIGS. 7A and 7B illustrate an operation in which a color sensor measures a patch image on a sheet.
Figure 7B:
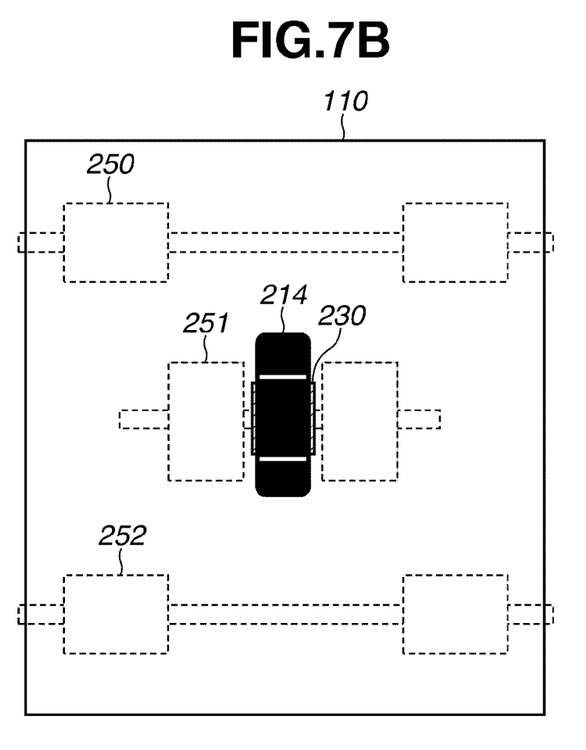

Next, operation of the white reference plate 230 and the shutter 214 will be described with reference to FIGS. 6A and 6B and FIGS. 7A and 7B. FIGS. 6A and 6B are a series of diagrams illustrating an operation in which the color sensor 200 measures the white reference plate 230. FIGS. 7A and 7B are a series of diagrams illustrating an operation in which the color sensor 200 measures a patch image on the sheet 110.

FIG. 6A is a cross-sectional view of the vicinity of the color sensor 200. FIG. 6B illustrates how the vicinity of the white reference plate 230 looks when viewed from the direction of arrow A in FIG. 6A. FIGS. 7A and 7B also illustrate the same layout as FIGS. 6A and 6B. Although for convenience these drawings only show one color sensor, as described above, in actual practice four color sensors 200a to 200d are provided.

During the measurement of the white reference plate 230, as illustrated in FIG. 6A, the color sensor 200 is pressed by a pressing member, such as a spring, to the color sensor 200 side, and is positioned against the color sensor 200. Consequently, there is no difference in the angle or the distance of the position of the white reference plate 230 with respect to the color sensor 200.

Thus, the color sensor 200 measures the white reference plate 230 in a state in which the position of the white reference plate 230 has been fixed by pressure. Further, during the measurement of the white reference plate 230, as illustrated in FIG. 6B, the shutter 214 is retracted from the white reference plate 230.

On the other hand, during the measurement of the patch image, as illustrated in FIG. 7A, the sheet 110 is conveyed by conveyance rollers 250 to 252, and the patch image on the sheet 110 is measured by the color sensor 200. At this stage, the white reference plate 230 is separated from the color sensor 200 so as not to interfere with conveyance of the sheet 110.

The white reference plate 230 is driven by the white color reference plate drive motor 311, which can make it difficult to accurately position the separation distance of the white reference plate 230 due to the influence of the tolerances of the plurality of parts, such as gears and the like. Consequently, every time a separation operation of the white reference plate 230 is performed, there is a difference in the separation position.

During the measurement of the patch image, light irradiated from the color sensor 200 passes through the sheet 110 and is irradiated on the white reference plate 230. Light reflected from the white reference plate 230 is received by the color sensor 200. Since the amount of reflected light from the white reference plate 230 varies depending on the distance from the color sensor 200 to the white reference plate 230, the measurement value varies due to differences in the separation position of the white reference plate 230.

Accordingly, as illustrated in FIG. 7B, the shutter 214, which is black, is slid between the color sensor 200 and the white reference plate 230. Based on this operation, during the period that the patch image on the sheet 110 is being measured by the color sensor 200, the background color of the sheet 110 is black (hereinafter referred to as "black backing").

Thus, by using a black backing during the measurement of the patch image, the light that has passed through the sheet is no longer reflected from the shutter 214, so that variation in the measurement value is eliminated even if there is a difference in the separation position of the white reference plate 230. Further, along with the operation for closing the shutter 214 and covering the white reference plate 230, the conveyance roller 251 moves to a position abutting the color sensor 200. Consequently, flapping of the sheet 110 during patch image measurement can be reduced, so that the patch image can be accurately measured.

Figure 8:
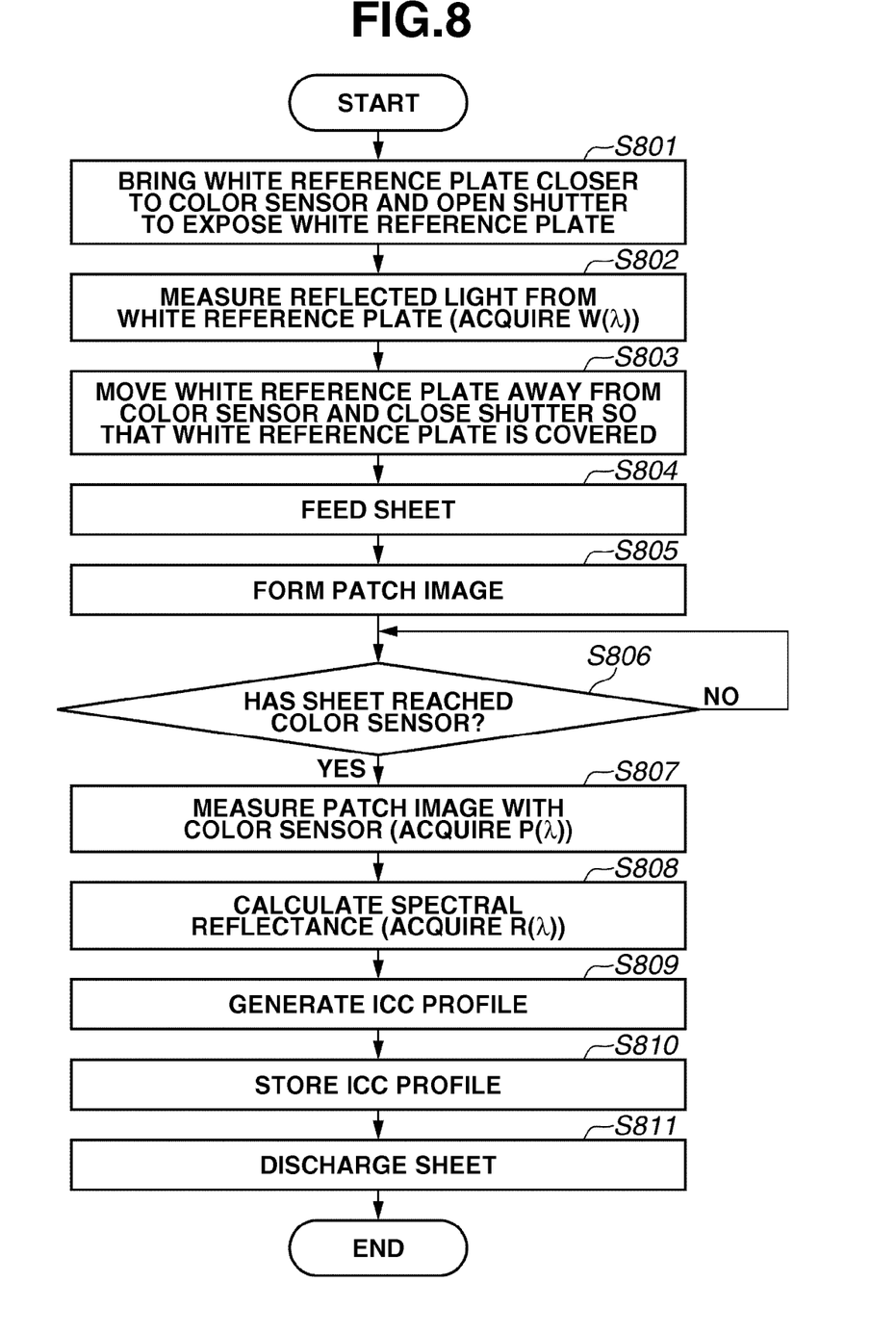
FIG. 8 is a flowchart illustrating a multicolor correction processing operation.

FIG. 8 is a flowchart illustrating a multicolor correction processing operation. The processing illustrated in this flowchart is executed by the printer controller 103. Further, this processing is executed based on instructions from the operation unit 180.

First, in step S801, the printer controller 103 issues an instruction to the engine control unit 102 to bring the white reference plate 230 closer to the color sensor 200 (attachment operation), and open the shutter 214 so as to expose the white reference plate 230 (opening operation). The engine control unit 102 controls the white color reference plate drive motor 311 and the shutter drive motor 312 based on this instruction.

Next, in step S802, the printer controller 103 irradiates light toward the white reference plate 230 using the color sensor 200, and measures the reflected light from the white reference plate 230. As described above, this measurement value is $W(\lambda)$.

When measurement of $W(\lambda)$ is finished, in step S803, the printer controller 103 issues an instruction to the engine control unit 102 to move the white reference plate 230 away from the color sensor 200 (detachment operation), and close the shutter 214 so as to cover the white reference plate 230 (closing operation). The engine control unit 102 controls the white color reference plate drive motor 311 and the shutter drive motor 312 based on this instruction.

Next, in step S804, the printer controller 103 issues an instruction to the engine control unit 102 to feed the sheet 110 from the storage unit 113. Then, in step S805, the printer controller 103 issues an instruction to the engine control unit 102 to form a patch image for multicolor correction processing on the sheet 110.

Next, in step S806, the printer controller 103 waits until the sheet 110 on which the patch image has been formed reaches the color sensor 200. When the sheet 110 has reached the color sensor 200, in step S807, the printer controller 103 measures the patch image with the color sensor 200. As described above, this measurement value is $P(\lambda)$.

The spectral reflectance $R(\lambda)$ of the patch image is determined from the $W(\lambda)$ acquired in step S802 and the $P(\lambda)$) acquired in step S807. $R(\lambda)$ can be determined by dividing $P(\lambda)$ by $W(\lambda)$ ($R(\lambda)=P(\lambda)/W(\lambda)$). Then, in step S808, the printer controller 103 acquires the spectral reflectance data $R(\lambda)$ output from the color sensor 200.

Next, the printer controller 103 calculates color value data ($L^*a^*b^*$) based on the spectral reflectance data $R(\lambda)$ output from the color sensor 200 using the Lab calculation unit 303. In step S809, based on this color value data ($L^*a^*b^*$), the printer controller 103 generates an ICC profile as an image formation condition based on the processing described above. In step S810, the printer controller 103 stores the generated ICC profile in the output ICC profile storage unit 305.

Then, in step S811, the printer controller 103 issues an instruction to the engine control unit 102 to discharge the sheet 110, and finishes the processing performed in this flowchart.

Figure 9:
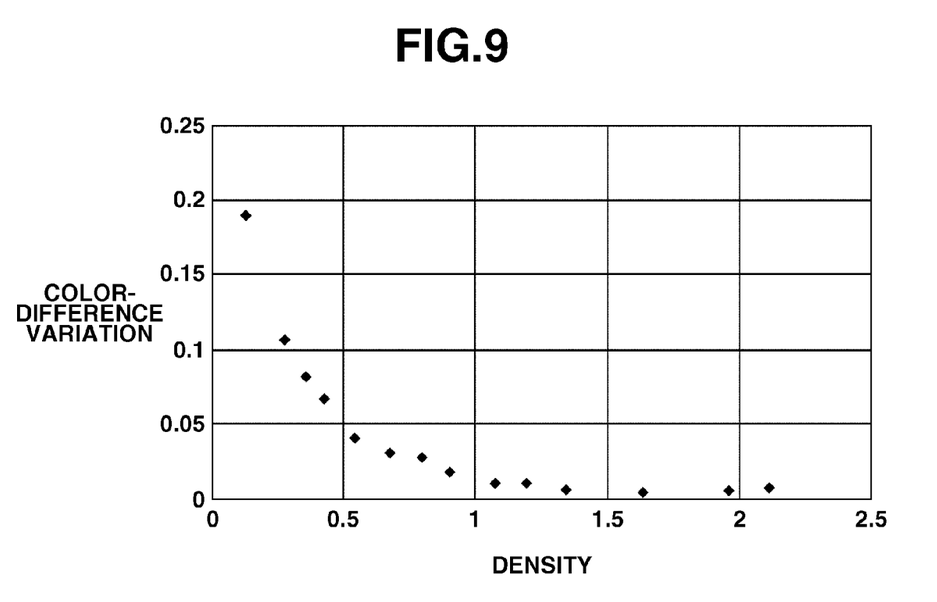
FIG. 9 illustrates a relationship between shielding unit density and shielding unit color difference variation.

FIG. 9 illustrates a relationship between the density of the backing member (shutter 214), which is a black member, and the variation in the color difference ΔE of the backing member. From this diagram, it can be seen that the variation in color difference is almost flat at a backing member density of 1.0 or more. Therefore, by setting the density of the backing member to be equal to or greater than 1.0, the variation in color difference ΔE is about 0.01, so that highly accurate measurement can be performed.

Figure 10A:
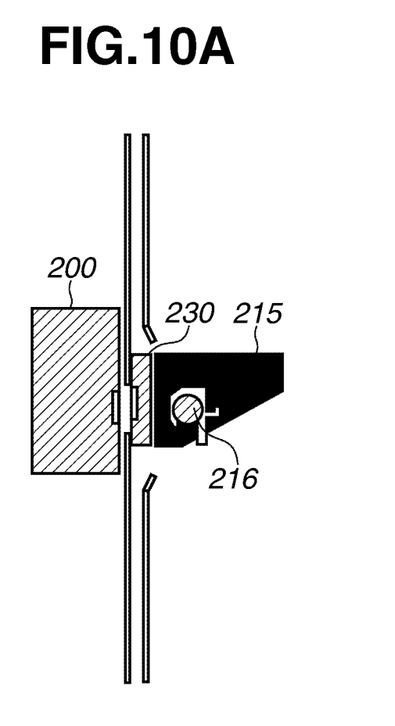
FIGS. 10A and 10B illustrate operation of a white reference plate according to another exemplary embodiment.
Figure 10B:
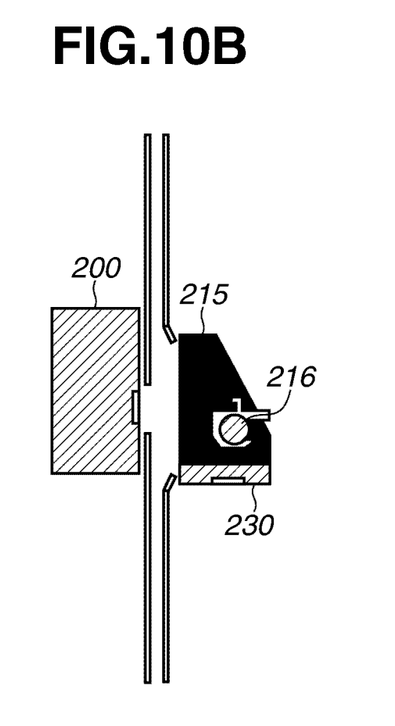

FIGS. 10A and 10B are a series of diagrams illustrating operation of a white reference plate according to another exemplary embodiment. FIG. 10A illustrates a state in which the white reference plate 230 has been brought close to the color sensor 200 (attached state). In FIG. 10A, the white reference plate 230 is supported by a black support member 215. The white reference plate 230 is positioned opposite the color sensor 200. In this state, the color sensor 200 measures the white reference plate 230.

When not measuring the white reference plate 230, the support member 215 is rotated about a shaft 216, and the white reference plate 230 is retracted to the position illustrated in FIG. 10B (detached state). During rotation, the support member 215, the white reference plate 230, and the shaft 216 are temporarily retracted in a direction away from the color sensor 200 so that the white reference plate 230 does not hit the color sensor 200.

During the measurement of the patch image, the white reference plate 230 is retracted from the white reference plate 230, and the black support member 215 moves to a position opposite the color sensor 200. By configuring in this manner, the same effects as the above-described exemplary embodiment can be obtained.

Figure 11:
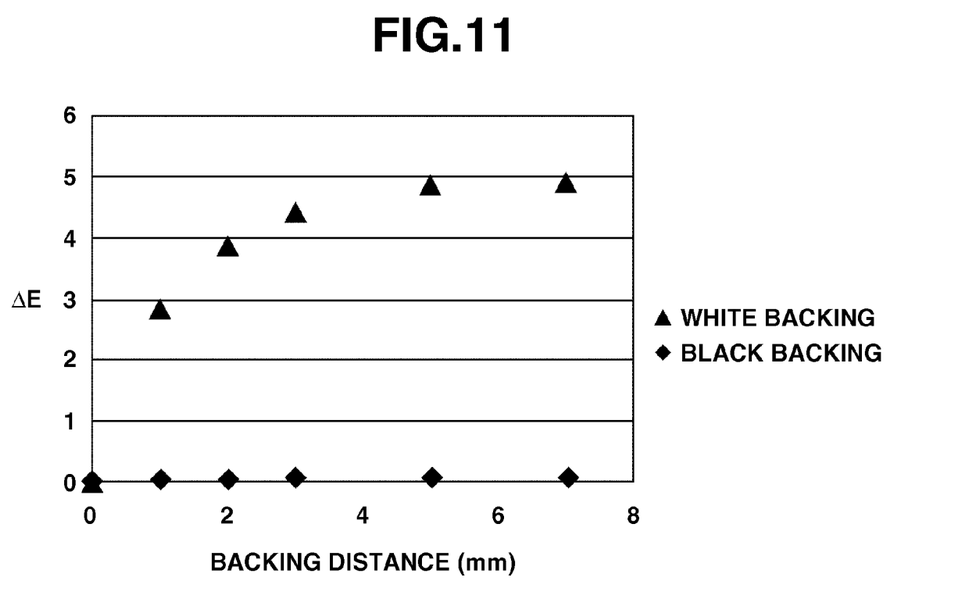
FIG. 11 illustrates a relationship between backing distance and color difference.

FIG. 11 is a diagram illustrating a relationship between the backing distance and the color difference ΔE. The backing distance is the distance from the color sensor 200 to the member serving as the background.

In FIG. 11, the variation in measurement values with respect to the variation in distance from the color sensor 200 to the black shutter 214 when the black shutter 214 is the background (black backing case) is represented by a star-shaped mark. Further, the variation in measurement values with respect to the variation in distance from the color sensor 200 to the white reference plate 230 when the black shutter 214 is the background (white backing case) is represented by a triangle-shaped mark.

According to FIG. 11, in a white backing case, it can be seen that the measurement values greatly vary when the backing distance varies. On the other hand, in a black backing case, it can be seen that the measurement values hardly change even if the backing distance varies, so that color measurement can be performed highly accurately. Therefore, by measuring the patch image with the black shutter 214 as the background, like in the present exemplary embodiment, stable measurement values can be obtained.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2012-288230 filed Dec. 28, 2012, which is hereby incorporated by reference herein in its entirety.

What is claimed is:

1. An image forming apparatus comprising:
an image forming unit configured to form a measurement image on a sheet;
a conveyance unit configured to convey the sheet;
a measurement unit configured to irradiate light on the measurement image and measure reflected light from the measurement image;
a white reference plate provided to be movable to a first position opposite the measurement unit and to a second position that is further away from the measurement unit than the first position;
a black member provided to be movable to a third position where the black member shields light that is irradiated on the white reference plate from the measurement unit and to a fourth position that is retracted from the third position,
a guide unit provided at a position opposite the measurement unit and configured to be movable to a fifth position, where the guide unit guides the sheet to a side of the measurement unit and to a sixth position, that is further away from the measurement unit than the fifth position; and
a control unit configured to, in a state in which the white reference plate is at the second position, the black member is at the third position, and the guide unit is at the fifth position, control the conveyance unit to convey the sheet between the measurement unit and the black member, and control the measurement unit to measure the measurement image,
wherein the conveyance unit includes a first roller pair, provided upstream of the guide unit in a conveyance direction of the sheet, and a second roller pair, provided downstream of the guide unit in the conveyance direction of the sheet, and
wherein while the guide unit is at the fifth position, a part of the sheet is closer to the measurement unit than a virtual plane connecting a first nip portion of the first roller pair and a second nip portion of the second roller pair.

2. The image forming apparatus according to claim 1, wherein the control unit controls, when measurement of the white reference plate is performed by the measurement unit, the black member to be at the fourth position and the white reference plate to be at the first position.

3. The image forming apparatus according to claim 2, wherein the control unit further controls, when the measurement of the white reference plate is performed by the measurement unit, the guide unit to be at the sixth position.

4. The image forming apparatus according to claim 1, further comprising a generation unit configured to generate an image formation condition when forming an image on a sheet based on a measurement result of the measurement image by the measurement unit.

5. The image forming apparatus according to claim 1, wherein the measurement unit is further configured to acquire spectral reflectance of the measurement image based on a measurement result of the measurement image and a measurement result of the white reference plate.

6. The image forming apparatus according to claim 1, wherein the black member is a shutter configured to block light irradiated by the measurement unit that has passed through the sheet to prevent the light from being irradiated on the white reference plate.

7. The image forming apparatus according to claim 1, wherein the measurement image is a multicolor image formed from color materials in a plurality of colors, and
wherein the measurement unit is configured to measure spectral information in the measurement image.

8. The image forming apparatus according to claim 1, wherein the black member has a density of 1.0 or more.

9. The image forming apparatus according to claim 1, wherein the measurement image formed by the image forming unit is a multicolor image formed from a plurality of color materials superimposed over each other.

10. The image forming apparatus according to claim 1, wherein the guide unit is configured to push the sheet to the side of the measurement unit at a position different from a measurement position of the measurement unit in a direction perpendicular to the conveyance direction of the sheet.

11. The image forming apparatus according to claim 10, wherein the guide unit is configured to push the sheet to the side of the measurement unit at a same position as the measurement position in the conveyance direction of the sheet.

12. The image forming apparatus according to claim 1, wherein in a case where the guide unit is at the sixth position, the guide unit is not in contact with the sheet.

13. The image forming apparatus according to claim 1, wherein the guide unit is a roller.

\* \* \* \* \*